Sept. 8, 1953     S. E. GARUTSO     2,651,237

BALANCED FOCUS LENS SYSTEM

Filed Aug. 1, 1946

STEPHEN E. GARUTSO
        *INVENTOR.*

BY William R. Ballard
        *ATTORNEY*

Patented Sept. 8, 1953

2,651,237

UNITED STATES PATENT OFFICE 2,651,237

BALANCED FOCUS LENS SYSTEM

Stephen E. Garutso, San Fernando, Calif., assignor, by mesne assignments, to Balanscope, Inc., a corporation of California Application August 1, 1946, Serial No. 687,621

6 Claims. (Cl. 88—57)

This invention relates to lenses such as the objectives of cameras and other optical instruments where a correct image of objects or scenes is desired, and its object is to increase the depth of focus, improve the fidelity of the image and decrease distortion.

In general these objects are attained by combining with a known type of lens, one or more annular converging lens elements herein called balancing elements and which overlie the peripheral part of the elements of the conventional lens. The conventional lens should be such as to be itself capable of focusing objects at various distances in accordance with known practice. With the latter, then, focused by its own scale to infinity or on very distant objects, the annular elements have the effect of presenting to the conventional lens and to the plate or film, the light rays from nearby objects as if they came from optical infinity so that all objects appear in focus upon substantially the principal focal plane of the conventional lens.

This application is a continuation in part of my earlier application Serial No. 667,328, filed May 4, 1946, now Patent No. 2,546,995, issued April 3, 1951, and relates to the type of balanced lenses disclosed in my application Serial No. 581,382, filed March 7, 1945, now abandoned, and Serial No. 624,501, filed October 25, 1945, now Patent No. 2,550,685, issued May 1, 1951.

Figure 4:
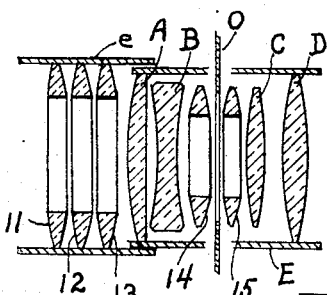
Figure 5:
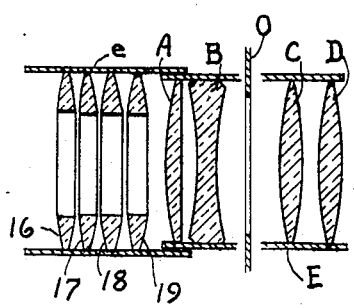
Figure 6:
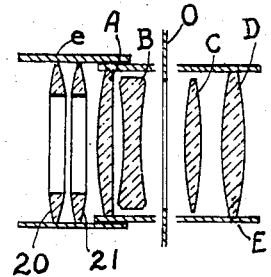

Figures 4, 5 and 6 each show a different example of how the invention may be embodied in a known lens of shorter focal length.

Figure 1:
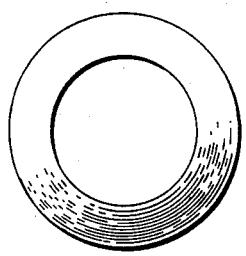
Figure 1 is a side view of one of the annular balancing elements suitable for use in embodiments of the invention.

I have found that, with full diaphragm opening, any required depth of focus, within wide limits depending upon the character of the conventional lens to be used, can be attained by combining with it annular balancing lens elements such as indicated in Figure 1 each having the central opening or non-refractive area such that its effective diameter is in the region of ⅔ of the diameter of the cone of rays transmitted by the conventional lens, measuring at the point where the balancing element is located, and that this result can be attained with an increased light gathering power by using balancing elements of substantial power grouped for the most part in front of the elements of the conventional lens.

With this balancing arrangement, also, the familiar distortion of present lenses in relative size, as between near and more remote objects, is greatly reduced, so that they appear in approximately their true proportions.

Furthermore, the proper focusing of all objects and their true relative size gives them an appearance of roundness and perspective lacking in other pictures.

In producing lenses balanced for focus in accordance with this invention, it is convenient to start with a selected known lens having the desired characteristics as to length of focus, speed, field of coverage etc., although if desired a newly designed conventional lens may be used. When combining the annular balancing elements with such a conventional lens there are five main factors to be considered, viz. (1) the number of balancing elements to be used, (2) the total and individual refractive power of the elements, (3) their location with respect to the elements of the conventional lens and each other, (4) the outside diameters of the balancing elements and (5) their inside diameters.

The number of elements to be used is not critical. It will be determined in part by the available space within the limits of the finished lens. In general a number of elements is to be preferred to one of the same total refractive power because the great curvature of the one equivalent element tends to introduce distortion and coma, but too great a subdivision of the total needed refractive power among several elements may result in excessive bulk and the creation of a pipe-like effect preventing desired interplay of the rays between the peripheral part and the central part of the finished lens.

The total refractive power of the balancing elements will depend largely upon how near to the lens the intended front focal plane is to be—with the scale of the conventional lens set on infinity. The total needed refractive power can be determined by the laws of optics. The distribution of this refractive power among the several units is very flexible, e. g. a total of 80 dioptrics might be made up of two forties or four twenties or two fifteens and two tens etc., depending largely upon the particular conventional lens to be used and dimensional limitations.

The location of the balancing elements with respect to those of the conventional lens and each other, is also not critical so long as they are located along the principal axis and are close enough to the conventional lens elements to encompass the cone of rays entering the lens. Bulk limitations will usually require close positioning. Where the elements are spaced apart the known effect of this on the focusing must be taken into account. The present invention involves the discovery of special advantages in a grouping largely in front of the conventional lens.

The outside diameters of the several balancing elements will in general correspond to the working diameters of the elements of the conventional lens with which they are most closely associated, except that when they are in front of or behind the body of the conventional lens they will preferably have a somewhat larger outside diameter to take in the entire cone of rays entering or leaving the conventional lens.

The inside diameters of the annular elements are more critical. If they are too large the nearby objects will not be brought into focus and depth of focus is lost. If these diameters are correct both near and distant objects appear in proper focus and of full and equal brilliance. If the inside diameters are just slightly too small there will be some aberration effects in the image. If made somewhat smaller still double images will result. If they are much too small the focal length of the conventional lens is altered. However, balancing elements when located near the middle of the assembly or when designed for use with a restricted diaphragm opening may have smaller inside diameters than otherwise and still encompass the cone of light rays passed. The optimum inside diameter for every case cannot be stated beforehand because the number of possible conventional lenses and the possible distribution of the balancing elements therein are unlimited; but by simple optical tests in any given case in accordance with the foregoing principles, the optimum can easily be determined.

To illustrate how the balancing elements may be combined with a conventional lens in accordance with the present invention I have shown in the drawings several embodiments of the invention as heretofore constructed and successfully used.

For convenience of comparison, in each case illustrated I have shown the invention as embodied in a type of lens commonly used in the taking of 35 millimeter motion pictures. For pictures of this size, 3 inches is a long focal length and 1 inch is a short focal length. The invention applies equally, however, to other types of lenses and to any focal length.

In each of the Figures 2 to 6 inclusive, A, B, C and D indicate the four lens elements of a known type of motion picture lens and O indicates the diaphragm. In each case the lens elements are supported concentrically in the usual mounting indicated diagrammatically at E; and in each case the balancing elements forward of the conventional lens are concentrically supported in an extension mounting e.

Figure 2:
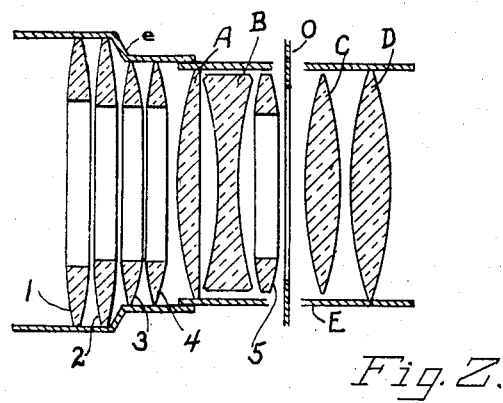
Figure 2 shows an embodiment of the invention in a known commercial lens of long focal length.

In Figure 2 five balancing elements are shown combined with the conventional lens elements. Elements 1, 2, 3 and 4 are located close together in front of the conventional lens. Element 5 is placed within the body of the conventional lens, preferably immediately in front of the diaphragm. The outer balancing elements, for reasons already stated have a large diameter than that of the conventional lens. Assuming that the conventional lens of this figure has the characteristics of a Cooke cinema lens of 3" focal length and a speed of f/2.8 the refractive power of the elements 1, 2, 3, 4 and 5, expressed in dioptrics, may be 7, 7, 4, 5, and 10 respectively (all being plus integers). The inside diameters of these elements will be approximately ⅔ of the working diameters of adjacent conventional lens elements or of the cone of light rays at the point where they are located. A conventional long focal lens of this type cannot be focused on objects closer than about 10 feet and when so focused with the diaphragm wide open, has a very shallow depth of focus. Combined with the balancing elements as shown, however, the lens may be focused on its own scale to 25 feet or more and objects from 10 feet to well beyond the 25 feet will be in sharp focus and more remote objects in fair focus.

Figure 3:
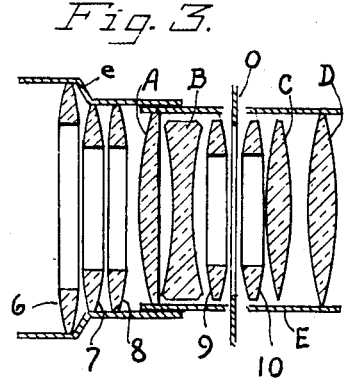
Figure 3 is another example of the invention using the same long focus lens.

In Figure 3 the same 3" focal length lens is shown balanced with five elements differently arranged: three are in front of the lens and two are within it, one immediately on each side of the diaphragm. Again the forward elements have somewhat larger outside diameters and the inside diameters of all of the annular elements are such as to encompass approximately ⅔ of the diameter of the active cone of rays. In this case the refractive powers of the elements 6, 7, 8, 9 and 10, expressed in dioptrics, are 10, 20, 10, 20 and 20 respectively. With this arrangement the same commercial lens as indicated in referring to Figure 2 may be focused on its own scale to 50 feet or more and all objects from about nine feet to the horizon will be in excellent focus.

Figure 4 represents a commercial cinema lens of 50 millimeters focal length balanced with five annular elements, 11, 12, 13, 14 and 15. Elements 11, 12, and 13 have refractive powers of 20 dioptrics each and are grouped in front of the element A of the conventional lens. They have an outside diameter preferably a millimeter or two greater than that of the element A and an inside diameter of approximately ⅔ of the outside diameter. Elements 14 and 15 have refractive powers of 40 and 20 dioptrics respectively and are located close to the diaphragm and on either side thereof. The adjacent elements B and C and the elements 14 and 15 have outside diameters somewhat less than the front element A and the inside diameters of 14 and 15 are approximately ⅔ of their outside diameters. This balanced lens, with the focusing scale of the conventional lens set for infinity and the diaphragm wide open (f/2.8), will bring into focus on the same plane all objects from the horizon to a front plane of 5½ feet from the lens.

Figure 5 represents a commercial cinema lens of 35 millimeters focal length balanced with four elements, 16, 17, 18 and 19, all grouped in front of the conventional lens. Their outside diameters are preferably slightly greater than that of the element A, and their inside diameters are approximately ⅔ of their outside diameters. The refractive powers of the elements 16, 17, 18 and 19, expressed in dioptrics, are 20, 20, 40 and 40 respectively. This balanced lens, with the focus set on infinity on the conventional lens scale and with the diaphragm wide open (f/2.8), will bring into focus on a single plane all objects from the horizon up to a front plane 42 inches from the lens.

Figure 6 represents a commercial cinema lens of 1 inch focal length balanced with two balancing elements, 20 and 21, both immediately in front of the conventional lens. They preferably have outside diameters slightly greater than that of the element A of the conventional lens, and inside diameters of approximately ⅔ their outside diameters. Each of the two elements has a refractive power of 20 dioptrics. This balanced lens, with the focusing scale of the conventional lens set for infinity and the diaphragm wide open (f/2.5), will bring into focus on a single plane all objects from infinity up to a front focal plane 24 inches from the lens.

In all of the examples given above the elements located in front of the conventional lens are placed as close to each other as convenient and the group is preferably spaced 2 or 3 millimeters from the front element of the lens. It will be noted from an examination of Figures 2, 3, 4, 5, and 6, that the annular balancing elements are so closely spaced to each other or to elements of the conventional lens that the spherical surfaces would interfere with each other were it not for the central openings in the annular lenses. This fact provides the additional advantage of a considerable saving in overall length of the assembly, in addition to which the annular lens elements may be placed in the relatively limited space between the elements of the conventional lens.

A lens balanced for focus as herein described may also be focused, by its original scale, on objects nearer than infinity (or other remote points as above mentioned) and in that case objects much nearer than the front planes mentioned may be brought into focus, and while very distant objects will then be somewhat out of focus, the depth of focus obtained with any setting of the scale will be very much greater than without the use of this invention.

It will be clear from what has been said that the particular structures herein described are illustrative only and that many variations in detail and arrangement may be made without departing from the spirit of my invention as set forth in the appended claims.

What I claim as my invention and desire to secure by Letters Patent is:

1. In combination with a conventional photographic objective of the type having a plurality of axially spaced elements grouped forwardly and rearwardly of a relatively large air space adjacent the optical center thereof, said objective having a power $p$, depth of field increasing means comprising a plurality of annular double convex lenses, each concentrically positioned in the light cone of said objective and forward of the rearmost element of said objective, said annular lenses each having an external diameter substantially equal to that of the light cone measured at the position of said annular lens therein, each of said annular lenses having an internal diameter not less than two-thirds of its external diameter, and the sum of the powers of said annular lenses being between $p$ and $6.1p$.

2. The construction of claim 1 further characterized in that two of said annular lenses are positioned in said air space, each having a power of substantially $2.6p$.

3. The construction of claim 1 further characterized by having a diaphragm aperture in said air space and by having two of said annular lenses positioned in said air space on opposite sides of said diaphragm.

4. The construction of claim 3 further characterized in that the annular lens in front of said diaphragm has a power of $2p$, and that behind said diaphragm a power of $p$.

5. In combination with a conventional photographic objective of the type having a plurality of axially spaced elements grouped forwardly and rearwardly of a relatively large air space adjacent the optical center thereof, said objective having a power $p$, depth of field increasing means comprising a plurality of annular double convex lenses, each concentrically positioned in the light cone of said objective and forward of the rearmost element of said objective, said annular lenses each having an external diameter substantially equal to that of the light cone measured at the position of said annular lens therein, each of said annular lenses having an internal diameter not less than two-thirds of its external diameter, the sum of the powers of said annular lenses being between $p$ and $6.1p$, at least one of said annular lenses being positioned in said air space and the remainder of said annular lenses being placed in a substantially face-to-face group immediately adjacent the front face of said conventional objective.

6. The construction of claim 5 further characterized in that said lens in said air space has a power of substantially $.76p$.

STEPHEN E. GARUTSO.

References Cited in the file of this patent

UNITED STATES PATENTS

| Number | Name | Date |
|---|---|---|
| 318,666 | Smith | May 26, 1885 |
| 1,154,232 | Byron | Sept. 21, 1915 |
| 1,169,731 | Mengel | Jan. 25, 1916 |
| 1,446,634 | Bell et al. | Feb. 27, 1923 |
| 1,627,892 | Frederick | May 10, 1927 |
| 1,954,755 | Heine | Apr. 10, 1934 |
| 1,979,159 | Howser | Oct. 30, 1934 |

FOREIGN PATENTS

| Number | Country | Date |
|---|---|---|
| 27,572 | Great Britain | of 1903 |
| 193,969 | Great Britain | Mar. 2, 1923 |
| 373,755 | Germany | Apr. 16, 1923 |
| 622,100 | France | Feb. 19, 1927 |